3,006,968
PRODUCTION OF ETHINYL IONOL

Heinrich Pasedach, Ludwigshafen (Rhine), and Matthias Seefelder, Ludwigshafen (Rhine), Gartenstadt, Germany, assignors to Badische Anilin- & Soda-Fabrik Aktiengesellschaft, Ludwigshafen (Rhine), Germany
No Drawing. Filed Feb. 19, 1959, Ser. No. 749,268
Claims priority, application Germany Feb. 22, 1958
5 Claims. (Cl. 260—617)

This invention relates to the production of ethinyl ionol.

The reaction of ionone with acetylene has repeatedly been attempted. Thus for example W. Oroshnik, in U.S. Letters Patent Nos. 2,425,201 and 2,472,310 describes the reaction of beta-ionone with acetylene in inert solvents with the employment of calcium or lithium acetylide. Calcium or lithium acetylide is prepared in liquid ammonia, diluted with diethylamine or diethyl ether and reacted with ionone at temperatures of about −40° C.

This method of working has great disadvantages because of the high price for calcium or lithium metal and the difficulties involved in working with liquid ammonia.

Moreover by this process there are always obtained reaction products which still contain considerable amounts of ionone in addition to ethinyl ionol. The separation of the unreacted ionone from ethinyl ionol however is difficult to carry out. In the usual case it requires reacting the ionone with semicarbazide and separating the ionone semicarbazone.

The previous attempts for the ethinylation of beta-ionone have been summarized by W. Oroshnik and D. Mebane in J. Am. Chem. Soc. 71, page 2062 (1949). Davies and Heilbron, J. Chem. Soc. 584 (1935), have attempted the ethinylation of beta-ionone in the presence of sodamide in ether at 0° C This reaction could however not be corroborated either by Oroshnik or by Gould and Thompson (see J. Am. Chem. Soc. 57, page 340 (1935)). Heilbron in J. Chem. Soc. (1944), page 144, states that the yields in the ethinylation of unsaturated ketones according to the usual methods are very small.

We have now found that ethinyl ionol is obtained in good yields by reacting ionone with acetylene in the presence of monosodium acetylide in a solvent which in each part by volume dissolves at least 10 parts by volume of acetylene. Both alpha- and beta-ionone can be ethinylated by this process.

The catalyst used is monosodium acetylide, and this may be readily formed from other substances under the reaction conditions. Therefore it is possible to use either monosodium acetylide itself or to use substances which can form monosodium acetylide under the reaction conditions, i.e. for example sodium metal, Sodamide, sodium hydride, disodium acetylide or organometallic sodium compounds, such as phenyl sodium and naphthalene sodium. A favorable course of the reaction is ensured when the proportion of monosodium acetylide is from 0.2 to 5.0 mols, advantageously from 1 to 2 mols, with reference to 1 mol of ionone. If, in the place of monosodium acetylide, substances forming monosodium acetylide during the reaction are used, equivalent amounts of the said substances must be used.

Suitable solvents are substances which have a good solvent power for acetylene dissolving at least 10 parts by volume of acetylene per part by volume at normal pressure and at 20° C., as for example tetrahydrofurane, dioxane, dimethylformal, diethylformal, dimethylacetal, dibutylacetal, glycol dimethyl ether, glycol methyl ethyl ether, glycol diethyl ether, ethers of diglycols and higher polyglycols, and also dimethylformamide, N-methyl-pyrrolidone, N.N-dimethylurethane, N-methylpyrrolidine and N-methylmorpholine.

Mixtures of the said solvents which have a smaller solvent power for acetylene insufficient for the reaction according to this invention, can also be used. Solvents of the latter type are, for example, diethyl ether, benzene and toluene. The mixtures must however be prepared in such proportions that the above-stated conditions for their solvent power is satisfied.

The preferred method of carrying out the reaction according to our invention is by dissolving or suspending sodium acetylide or substances capable of forming monosodium acetylide with acetylene in the said solvents, saturating the solution or suspension with acetylene and introducing the ionone at a temperature between 0° and 40° C., preferably at room temperature, while stirring.

The process may be carried out at normal or increased pressure, for example at a partial pressure of 3 to 30 atmospheres, especially 5 to 8 atmospheres, of acetylene.

It is good practice to pass a current of acetylene through the reaction mixture while the reaction is in progress. It has proved especially advantageous to use acetylene under pressure because the acetylene concentrations in the reaction mixture are considerably higher and hence a quantitative conversion of ionone into ethinyl ionol can be achieved when the pressure is increased. Besides giving better yields, the application of pressure has the special advantage of greatly facilitating the further processing of the reaction mixture.

In this manner, by simple distillation, chemically pure ethinyl ionol is immediately obtained. It crystallizes immediately upon cooling. By contrast, when the conversion of the ionone is incomplete, tedious operations are required to separate the unreacted ionone from the ethinyl ionol. When increased pressure is used the ordinary precautions required for working with acetylene under pressure must be taken.

Ethinyl ionol is an important intermediate product for the large-scale synthesis of vitamin A.

The following examples will further illustrate this invention but the invention is not restricted to these examples. The parts specified in the examples are parts by weight.

Example 1

A mixture of 96 parts of monosodium acetylide in 700 parts of dimethylformamide is charged in a stirring vessel and to this 192 parts of beta-ionone are added in the course of 4 hours at 20° C. while stirring, acetylene being simultaneously passed through. The mixture is further stirred for another 2 hours and 260 parts of petroleum ether having been added, it is neutralized with 730 parts of 20% acetic acid. The aqueous layer is separated from the organic layer and the organic layer is distilled. 201 parts of a pale yellow oil is obtained with the boiling point 96 to 98° C. at a pressure of 0.8 mm. Hg. It contains 79% of ethinyl ionol.

Example 2

Acetylene is fed into a mixture of 50 parts of sodium powder and 500 parts of tetrahydrofurane in a stirring vessel. After a few hours, the sodium has been quantitatively converted into monosodium acetylide forming a colorless suspension. Then 120 parts of dimethylformamide are added to the mixture and 192 parts of beta-ionone are introduced in the course of 4 hours at room temperature. The mixture is stirred for another 2 hours and then neutralized with 615 parts of about 20% acetic acid. The aqueous layer which forms is separated and the organic layer is distilled. There are obtained 198 parts of a yellow oil of the boiling point 96° to 98° C. at a pressure of 0.8 mm. Hg. It contains 80% of ethinyl beta-ionol.

Example 3

A stirring autoclave is charged with a mixture of monosodium acetylide prepared from 300 parts of sodium metal and 3,500 parts of tetrahydrofurane. After replacing the air with nitrogen, a mixture of nitrogen and acetylene is forced in until the partial pressure of acetylene in the reaction vessel is about 6 to 9 atmospheres. 1,690 parts of beta-ionone are then pumped into the autoclave in the course of 9 hours. The temperature is kept at 20° C. and the partial pressure of acetylene in the autoclave is kept at about 6 to 9 atmospheres.

After the beta-ionone has been introduced, the autoclave is stirred for another 3 hours at room temperature and then emptied. The reaction mixture is neutralized with 3,300 parts of 20% acetic acid, the aqueous layer is separated and the organic layer distilled. There are obtained 1,728 parts of a yellowish oil with the boiling point 96° to 98° C. at a pressure of 0.8 mm. Hg. This oil completely crystallizes when cooled.

The product obtained contains an ethinyl-beta-ionol of at least 99% strength. The refractive index of this product at 25° C. is 1.5010.

Example 4

460 parts of a 50 percent suspension of sodium amide in benzene (sodium amide content=230 parts) and 1,800 parts of tetrahydrofurane are treated with an acetylene/nitrogen mixture, composed of 15 atmospheres of nitrogen and 10 atmospheres of acetylene, at 80° C. in a stirring autoclave, until saturation is attained.

The content of the autoclave is then cooled down to 20° C. and 750 parts of beta-ionone is pumped in in the course of 7 hours. This done, stirring is continued for 3 hours and then the autoclave is emptied.

The reaction mixture is stirred with 500 parts of ice and neutralized with 2,000 parts of 20 percent acetic acid. The organic layer is separated from the aqueous layer and distilled first at normal pressure to recover the solvent and then at a pressure of 1 mm. Hg whereby 825 parts of a yellowish oil with the boiling point 102 to 104° C. are obtained. The product contains 98.5 percent of ethinyl-beta-ionol.

In an analogous manner ethinyl-alpha ionol is obtained from alpha-ionol with an equal yield.

We claim:
1. A process for the production of ethinyl ionol which comprises reacting ionone with acetylene at a temperature of between °0 C. and 40° C. in the presence of monosodium acetylide in an inert solvent which dissolves in each part by volume at least 10 parts by volume of acetylene. as determined at normal pressure and at 20° C.

2. The process as claimed in claim 1 wherein the monosodium acetylide is formed in situ under the reaction conditions from the acetylene and a compound selected from the group consisting of sodium metal, sodamide, sodium hydride, disodium acetylide, phenyl sodium and naphthalene sodium.

3. A process for the production of ethinyl ionol which comprises reacting ionone with acetylene at a temperature of between 0° C. and 40° C. in the presence of 0.2 to 5.0 mols of monosodium acetylide with reference to 1 mol of ionone in an inert solvent which dissolves in each part by volume at least 10 parts by volume of acetylene as determined at normal pressure and at 20° C.

4. A process for production of ethinyl ionol which comprises reacting ionone with acetylene at a temperature of between 0° C. and 40° C. and at a partial pressure of 3 to 30 atmospheres of acetylene, in the presence of 0.2 to 5.0 mols of monosodium acetylide with reference to 1 mol of ionone, in an inert solvent which dissolves in each part by volume at least 10 parts by volume of acetylene as determined at normal pressure and at 20° C.

5. A process for the production of ethinyl ionol which comprises reacting ionone with acetylene at a temperature of between 0° C. and 40° C. and at a partial pressure of 5 to 8 atmospheres of acetylene, in the presence of about 1 to 2 mols of monosodium acetylide with reference to 1 mol of ionone, in an inert solvent which dissolves in each part by volume at least 10 parts by volume of acetylene as determined at normal pressure and at 20° C.

References Cited in the file of this patent
UNITED STATES PATENTS

| | | |
|---|---|---|
| 2,602,092 | Oroshnik | July 1, 1952 |
| 2,858,344 | Kleinschmidt et al. | Oct. 28, 1958 |

UNITED STATES PATENT OFFICE
CERTIFICATION OF CORRECTION

Patent No. 3,006,968                                      October 31, 1961

Heinrich Pasedach et al.

It is hereby certified that error appears in the above numbered patent requiring correction and that the said Letters Patent should read as corrected below.

Column 1, line 7, in the heading to the printed specification, for "Ser. No. 749,268", read -- Ser. No. 794,268 --; column 2, line 3, before "which" insert -- with other solvents --; column 4, line 4, for "°0 C." read -- 0° C. --.

Signed and sealed this 24th day of April 1962.

(SEAL)
Attest:

ESTON G. JOHNSON
Attesting Officer

DAVID L. LADD
Commissioner of Patents